US012812266B2

(12) United States Patent
Han et al.

(10) Patent No.: US 12,812,266 B2
(45) Date of Patent: Nov. 24, 2026

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventors: Sangman Han, Tokyo (JP); Kazuya Mori, Tokyo (JP)

(73) Assignee: Brillnics Singapore Pte. Ltd., Singapore (SG)

( * ) Notice: Subject to any disclaimer, the term of this patent is extended or adjusted under 35 U.S.C. 154(b) by 106 days.

(21) Appl. No.: 18/680,154

(22) Filed: May 31, 2024

(65) Prior Publication Data

US 2024/0406595 A1 Dec. 5, 2024

(30) Foreign Application Priority Data

May 31, 2023 (JP) ................................ 2023-089998

(51) Int. Cl.

| | |
|---|---|
| ***H04N 25/63*** | (2023.01) |
| ***H04N 25/51*** | (2023.01) |
| ***H04N 25/62*** | (2023.01) |
| ***H04N 25/77*** | (2023.01) |
| ***H04N 25/771*** | (2023.01) |
| ***H04N 25/772*** | (2023.01) |
| ***H04N 25/78*** | (2023.01) |

(52) U.S. Cl.

CPC ............. *H04N 25/63* (2023.01); *H04N 25/62* (2023.01); *H04N 25/77* (2023.01)

(58) Field of Classification Search

CPC ........ H04N 25/62; H04N 25/63; H04N 25/77; H04N 25/51; H04N 25/771; H04N 25/772; H04N 25/78; H04N 25/59

See application file for complete search history.

(56) References Cited

U.S. PATENT DOCUMENTS

| | | | | |
|---|---|---|---|---|
| 7,164,114 | B2 | 1/2007 | Lai et al. | |
| 2005/0195304 | A1 | 9/2005 | Nitta et al. | |
| 2009/0294632 | A1* | 12/2009 | Rhodes | H04N 25/77 250/208.1 |
| 2010/0181464 | A1 | 7/2010 | Veeder | |
| 2013/0020466 | A1* | 1/2013 | Ayers | H04N 25/76 250/208.1 |
| 2014/0160332 | A1* | 6/2014 | Sumi | H04N 25/79 348/308 |
| 2023/0232133 | A1* | 7/2023 | Miyauchi | H04N 25/778 |

FOREIGN PATENT DOCUMENTS

| | | | |
|---|---|---|---|
| JP | 2005-278135 | A | 10/2005 |
| JP | 2005-295346 | A | 10/2005 |

* cited by examiner

*Primary Examiner* — Marly S Camargo

(74) *Attorney, Agent, or Firm* — Pillsbury Winthrop Shaw Pittman, LLP

(57) ABSTRACT

Provided are a solid-state imaging device, a method for driving a solid-state imaging device, and an electronic apparatus capable of providing characteristics of high gain and low noise as much as possible in a configuration that can detect stored signals during the integration period. A pixel includes a first transient gate PG formed between a floating diffusion FD and a photodiode PD and capable of controlling a charge transfer path CTP between the FD and the PD. The FD and the PD are coupled by the first transient gate PG, and photocharges generated by the PD are transferred immediately to the FD.

15 Claims, 13 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2023-089998 (filed on May 31, 2023), the contents of which are incorporated herein.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied in various types of electronic apparatuses such as digital cameras, video cameras, surveillance cameras, medical endoscopes, personal computers (PCs), mobile phones and other portable terminals (mobile devices) as their parts.

The CMOS image sensors include, for each pixel, a photodiode (a photoelectric conversion element) and a floating diffusion (FD) amplifier having a floating diffusion (FD). The mainstream design of the reading operation in the CMOS image sensors is a column parallel output processing of selecting one of the rows in the pixel array and reading the pixels in the selected row simultaneously in the column output direction.

Various types of pixel signal reading (output) circuits have been proposed for CMOS image sensors of the column parallel output scheme. Among them, one of the most advanced circuits is a circuit that includes an analog-to-digital converter (ADC) for each column and obtains a pixel signal in a digital format (see, for example, Japanese Patent Application Publication Nos. 2005-278135 and 2005-295346).

In this CMOS image sensor having column-parallel ADCs (column-wise-AD CMOS image sensor), a comparator compares the pixel signal against a so-called RAMP wave and a counter of a later stage performs digital CDS, so that AD conversion is performed.

The CMOS image sensors of this type are capable of transferring signals at high speed, but disadvantageously incapable of reading the signals with a global shutter.

To address this issue, a digital pixel sensor has been proposed that has, in each pixel, an ADC including a comparator (and additionally a memory part), so that the sensor can realize a global shutter according to which the exposure to light can start and end at the same timing in all of the pixels of the pixel array part (see, for example, FIG. 4 of U.S. Pat. No. 7,164,114 (B2) and US2010/0181464 (A1)).

The above-described conventional CMOS image sensor including a digital pixel sensor is capable of realizing global shutter function. In addition, if an ADC including a comparator is arranged in each pixel and reading is performed in a predetermined mode, the conventional CMOS image sensor is capable of achieving widened dynamic range.

The dynamic range can be widened by, for example, reading two types of signals having different integration durations from the same pixel of the image sensor and combining the read two types of signals, or by combining a signal with a small dynamic range read from a high-sensitive pixel and a signal with a widened dynamic range read from a low-sensitive pixel.

Digital pixel sensor (DPS) architecture was studied hopefully in the 1990s and early 2000s to achieve high speed, low power consumption, and high dynamic range (HDR) in global shutter (GS) operation. However, its optical performance was inferior to that of GS pixels at that time due to a low fill factor of the photodiode (PD) and a large pixel size because of the use of a front side illumination (FSI) element. Recent advances in CMOS manufacturing processes have enabled the stacked back-illuminated DPS approach, in which the CMOS image sensor (CIS) pixel, and the pixel-level analog-to-digital conversion (ADC) and the in-pixel memory are fabricated on separate stacked wafers, enabling a reduction in pixel size and higher image quality.

On this background, a stacked DPS using the triple-quantization (3Q) method has been developed, which achieves an ultra-low power of DR 127 dB and 5.7 mW power at 30 frames/second for a 4.6 μm pixel size using a 10-bit/pixel ADC.

The digital pixel sensor DPS consists of a charge storage part, an amplification circuit, and an analog-to-digital conversion part integrated together. Generally, an embedded photodiode with low dark current (low leakage and noise) is used for the charge storage part. A pinned photodiode is an embedded light-receiving element having a charge storage part not exposed on the semiconductor surface, whereas a surface-type light-receiving element has a charge storage part exposed on the semiconductor surface and placed in a floating state. Also, an embedded photodiode refers to a photodiode having a transistor structure with an NPN junction or PNP junction. The base region, which is not directly exposed on the light-receiving surface, constitutes an embedded layer that serves as a photocharge storage part. This embedded layer is depleted in the reset state, resulting in a relatively thin concentration junction.

As mentioned above, a digital pixel sensor (DPS) is constituted by a charge storage part, an amplification circuit, and an analog-to-digital conversion part integrated together, but to configure the circuit, it is necessary to electrically connect to the charge storage part and the input stage of the amplification circuit. However, if the circuit is configured in a silicon substrate, an ohmic connection is required to the amplification circuit and the charge storage part, and an extremely high concentration is required at the junction.

Therefore, the charge storage part included in the digital pixel sensor (DPS) is composed of N-type semiconductors containing a high concentration, but cannot be an embedded charge storage part, resulting in extremely degraded dark current characteristics. On this background, the triple-quantization (3Q) and 2Q methods have been developed to avoid this problem by distributing the photoelectric conversion signal on the low-illumination side to the embedded charge storage part and the signal on the high-illumination side to the storage part of the FD and individually quantizing the signals, while realizing low noise DPS having maintained the high dynamic range and low current consumption characteristics that are the advantages of the DPS. However, these methods also complicate circuit configuration, making it difficult to reduce the pixel size and degrading the SNR at each signal connection point.

The following describes the noise and dark current in the DPS constituted by a charge storage part, an amplification circuit (source follower), and a reset circuit.

Qsfnoise (SF Noise) depends on the junction capacitance Cpix, and the noise is lower as the capacitance is smaller. Since the photocharge storage part and the detection node are formed in the same location, the N+ region of the PD makes direct contact to connect the PD and the buffer gain. Therefore, dark current is induced by the N+ region, increasing the capacitance of the detection node.

The DPS architecture employs an ADC for each pixel, and digital data is read out from the image sensor array in the same manner as with the digital memory. The DPS has several advantages over analog image sensors, including very high dynamic range and global operation. However, it is inherently necessary that the photocharge storage region has to be a photo-detecting region, since the detection of photocharges is constantly necessary. Therefore, the PD region needs to be a high concentration region that allows ohmic contact. Since dark current performance is related to doping concentration and PD formation, the photocharge storage region also needs to be a high-dose region to prevent degradation of dark current performance. This photo-detecting area also needs to be common to the photocharge storage. Therefore, the capacitance of the photo-detector region connected to the buffer circuit is larger, resulting in lower noise performance.

SUMMARY

An object of the present disclosure is to provide a solid-state imaging device, a method for driving a solid-state imaging device, and an electronic apparatus capable of providing characteristics of high gain and low noise as much as possible in a configuration that can detect stored signals during the integration period.

A solid-state imaging device according to a first aspect of the disclosure comprises: a pixel part having pixels arranged therein, each pixel being configured to perform photoelectric conversion, wherein the each pixel includes: a photoelectric conversion element for generating photocharges by photoelectric conversion; a floating diffusion (FD) to which the photocharges generated by the photoelectric conversion element are transferred; and a first transient gate formed between the FD and the photoelectric conversion element and capable of controlling a charge transfer path between the FD and the photoelectric conversion element, and wherein the FD and the photoelectric conversion element are coupled by the first transient gate, and the photocharges generated by the photoelectric conversion element are transferred immediately to the FD.

A second aspect of the disclosure is a method for driving a solid-state imaging device, the solid-state imaging device including: a pixel part having pixels arranged therein, each pixel being configured to perform photoelectric conversion, wherein the each pixel includes: a photoelectric conversion element for generating photocharges by photoelectric conversion; a floating diffusion (FD) to which the photocharges generated by the photoelectric conversion element are transferred; and a first transient gate formed between the FD and the photoelectric conversion element and capable of controlling a charge transfer path between the FD and the photoelectric conversion element, the method comprising: coupling, by the first transient gate, the FD and the photoelectric conversion element; and transferring immediately the photocharges generated by the photoelectric conversion element to the FD.

An electronic apparatus according to a third aspect of the disclosure comprises: a solid-state imaging device; and an optical system for forming a subject image on the solid-state imaging device, wherein the solid-state imaging device includes: a pixel part having pixels arranged therein, each pixel being configured to perform photoelectric conversion, wherein the each pixel includes: a photoelectric conversion element for generating photocharges by photoelectric conversion; a floating diffusion (FD) to which the photocharges generated by the photoelectric conversion element are transferred; and a first transient gate formed between the FD and the photoelectric conversion element and capable of controlling a charge transfer path between the FD and the photoelectric conversion element, and wherein the FD and the photoelectric conversion element are coupled by the first transient gate, and the photocharges generated by the photoelectric conversion element are transferred immediately to the FD.

ADVANTAGEOUS EFFECTS

The present disclosure provides characteristics of high gain and low noise as much as possible in a configuration that can detect stored signals during the integration period.

9 also shows a simplified plan view, simplified cross-sectional view, and potential diagram showing an example configuration of a charge storage transfer system of a basic structure having a first transient gate PG.

Figure 10:
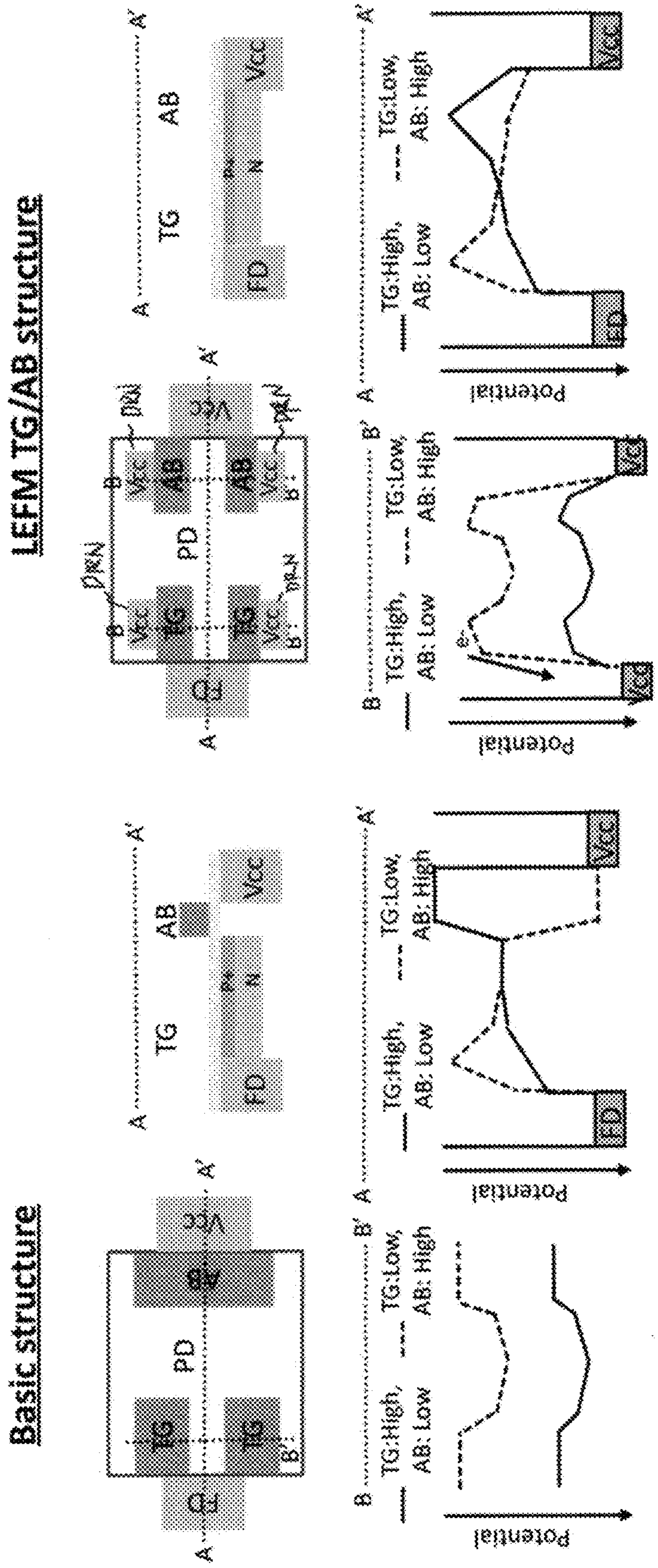

FIG. 10 shows a simplified plan view, simplified cross-sectional view, and potential diagram showing an example configuration of a charge transfer system having first and second transient gates, which are the main parts of the digital pixel relating to the third embodiment of the invention, and FIG. 10 also shows a simplified plan view, simplified cross-sectional view, and potential diagram showing an example configuration of a charge storage transfer system of a basic structure having a first transient gate PC.

Figure 11:
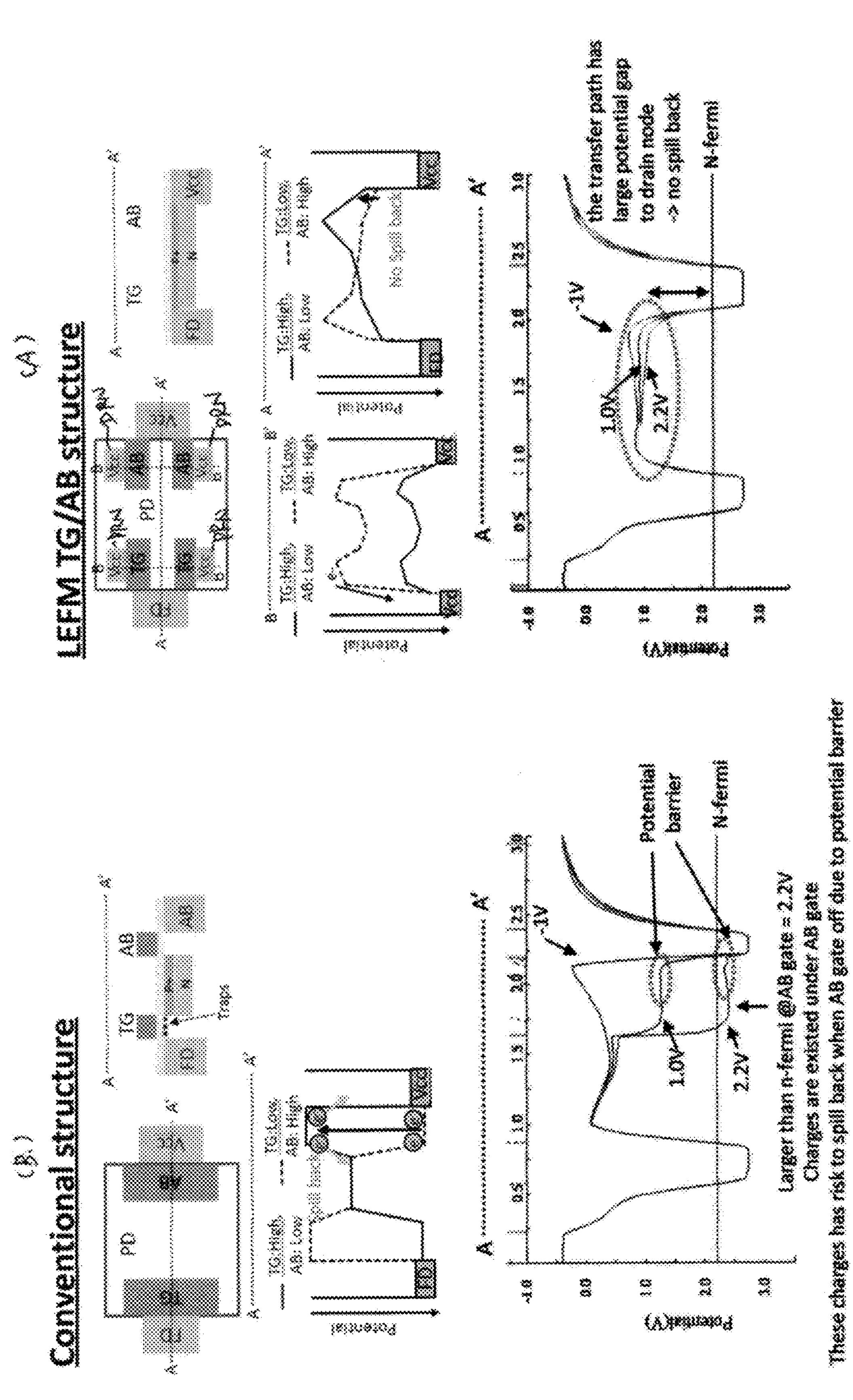

FIG. 11 shows a simplified plan view, simplified cross-sectional view, and potential diagram illustrating a simulation result of a charge transfer system having first and second transient gates, which are the main parts of the digital pixel relating to the third embodiment of the invention, and FIG. 11 also shows a simplified plan view, simplified cross-sectional view, and potential diagram illustrating a simulation result of a charge storage transfer system of a comparative example not having first and second transient gates PG.

Figure 12:
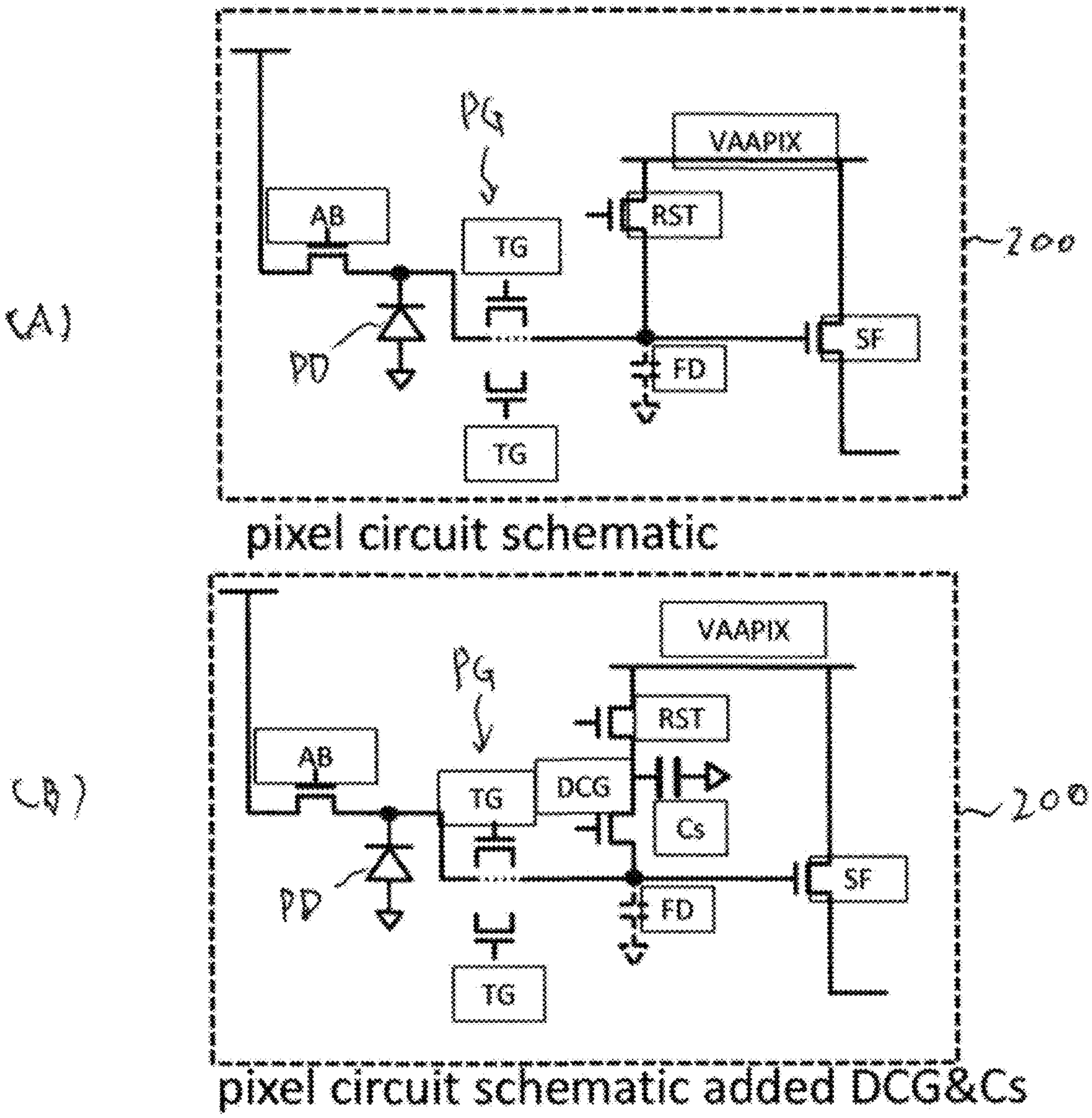

FIG. 12 shows examples of an equivalent circuit of the main part of a pixel with two modulation gates arranged along a charge transfer path.

Figure 13:
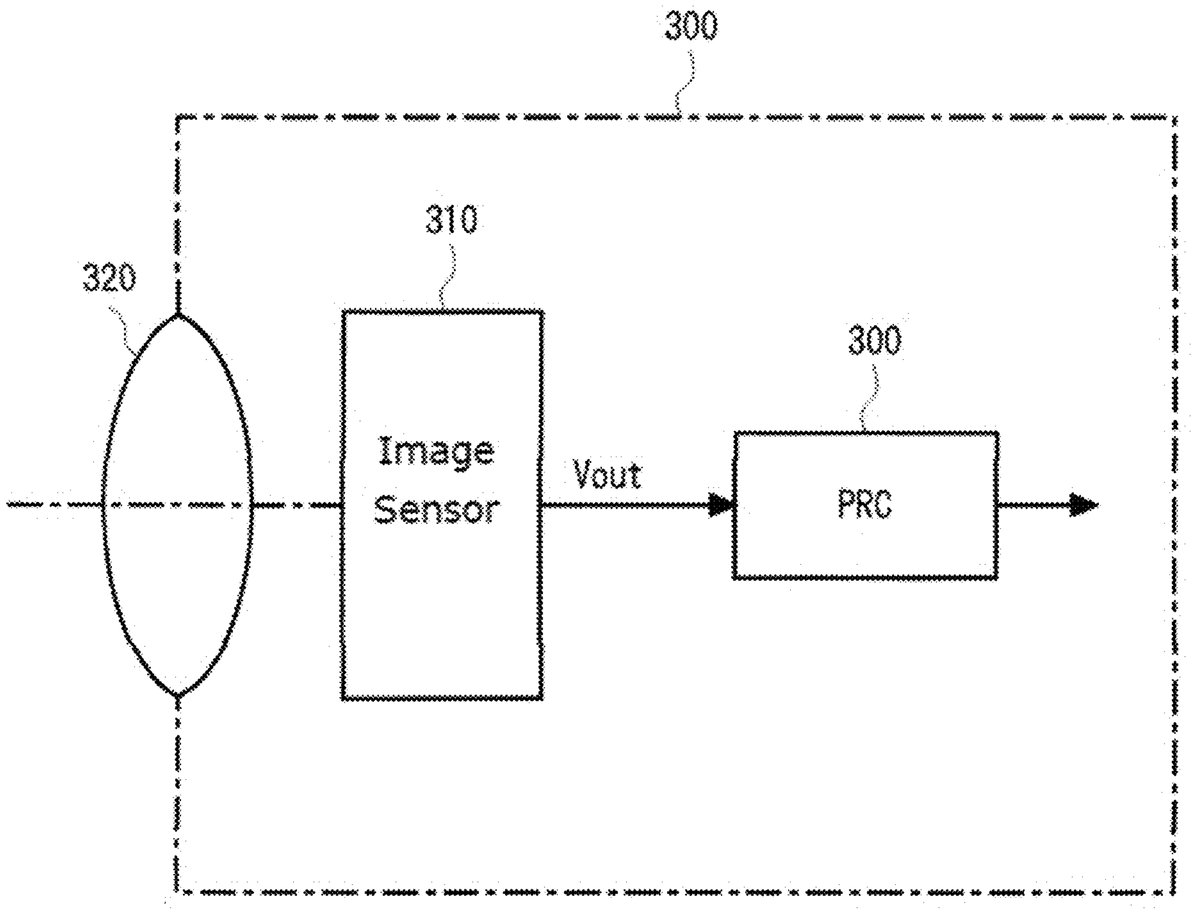

FIG. 13 shows an example configuration of an electronic apparatus to which the solid-state imaging devices relating to the embodiments of the present disclosure can be applied.

DESCRIPTION OF THE PREFERRED EMBODIMENTS

Embodiments of the present disclosure will be hereinafter described with reference to the drawings.

First Embodiment

Figure 1:
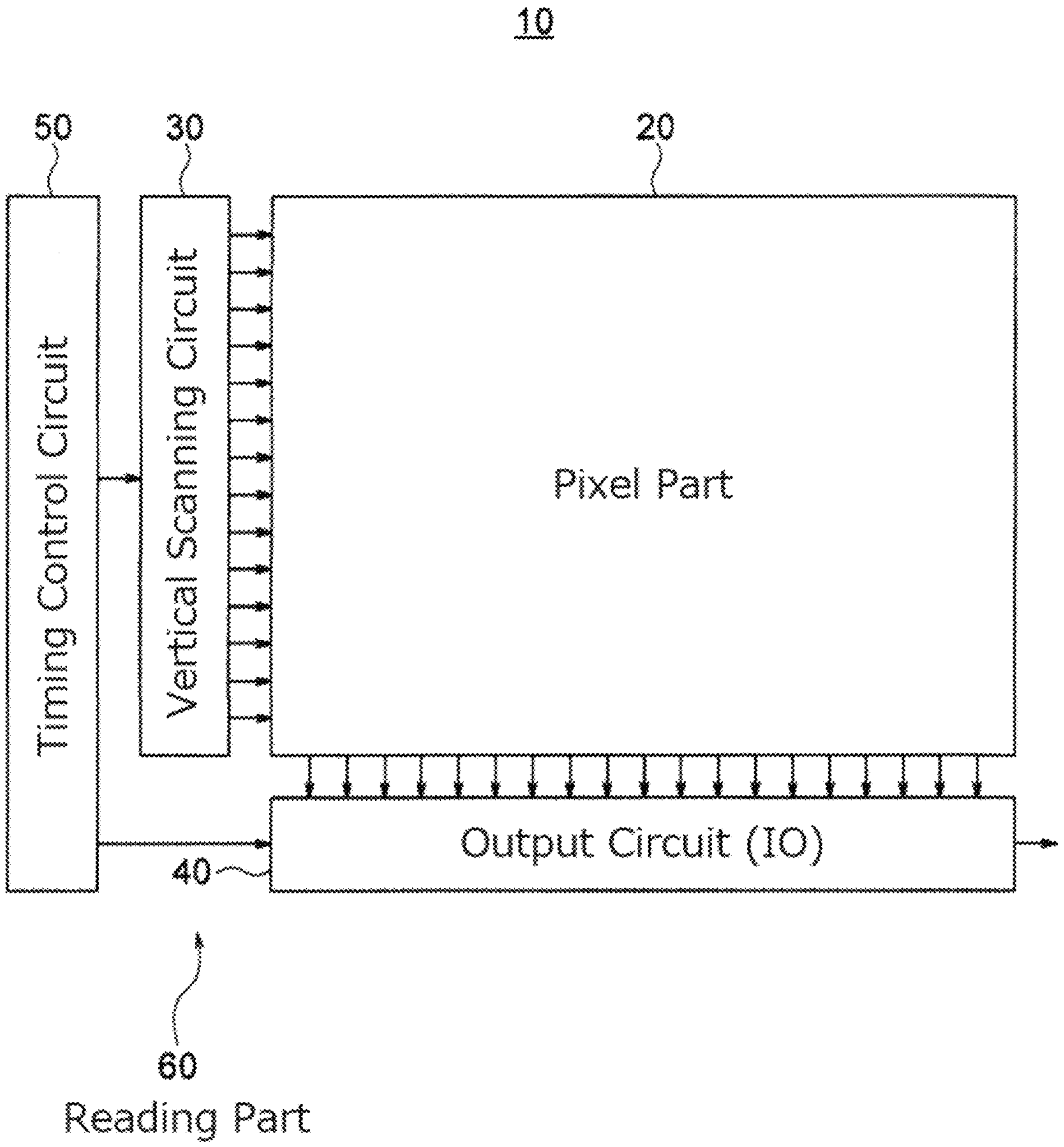
FIG. 1 is a block diagram showing an example configuration of a solid-state imaging device according to a first embodiment of the present invention.

FIG. 1 is a block diagram showing an example configuration of a solid-state imaging device according to a first embodiment of the present invention. In this embodiment, the solid-state imaging device 10 is constituted by, for example, a CMOS image sensor having digital pixels as pixels thereof.

As shown in FIG. 1, the solid-state imaging device 10 is constituted mainly by a pixel part 20 serving as an image capturing part, a vertical scanning circuit (a row scanning circuit) 30, an output circuit 40, and a timing control circuit 50. Among these components, for example, the vertical scanning circuit 30, the output circuit 40, and the timing control circuit 50 constitute a reading part 60 for reading pixel signals.

In the solid-state imaging device 10 relating to the first embodiment, the pixel part 20 includes digital pixels, and each digital pixel includes a photoelectric conversion reading part 210, an analog-to-digital (AD) converting part 220, and a memory part 230. The solid-state imaging device 10 is configured, for example, as a stacked CMOS image sensor. The solid-state imaging device 10 may be configured to be capable of operating in a global shutter mode. In the solid-state imaging device 10 relating to the first embodiment, as will be described in detail below, each digital pixel DP has an analog-to-digital (AD) converting function, and the AD converting part includes a comparator for comparing the voltage signal VSL read out by the photoelectric conversion reading part against a referential voltage VREF to analog-to-digital (AD) convert the read-out voltage signal VSL and outputting a resulting digital comparison result signal.

For example, under the control of the reading part 60, the comparator performs a first comparing operation and a second comparing operation. The first comparing operation is designed to output a digital first comparison result signal obtained by processing the voltage signal corresponding to the overflow charges that overflow from a photodiode PD (photoelectric conversion element) to the output node (floating diffusion FD) in an integration (exposure) period. The second comparing operation is designed to output a digital second comparison result signal obtained by processing the voltage signal corresponding to the charges stored in the photodiode PD (photoelectric conversion element) that are transferred to the output node (floating diffusion FD) in a transfer period following the integration period.

If irregular and strong light enters the photoelectric conversion element (photodiode PD) during the second comparing operation, unnecessary charges may be released from the photodiode PD (photoelectric conversion element) to outside of the floating diffusion FD region. For this purpose, the pixel relating to the present embodiment includes a shutter gate (SG or AB) for preventing a change in the level of the floating diffusion. Such a change in the FD level may be caused if the charges overflow from the PD (photoelectric conversion element) to the floating diffusion FD. In this way, even if irregular and strong light enters the photodiode PD (photoelectric conversion element) during the second comparing operation, the pixel is configured to be capable of successfully completing AD conversion by preventing a change in the FD level.

Furthermore, in the first embodiment, the pixel 200 includes a first transient gate PG that is formed between the floating diffusion FD and the photodiode PD (photoelectric conversion element) and can control the charge transfer path CTP between the floating diffusion FD and the photodiode PD (photoelectric conversion element). In the first embodiment, the floating diffusion FD and the photodiode PD (photoelectric conversion element) are coupled by the first transient gate PG, and the photocharges generated by the photodiode PD (photoelectric conversion element) are transferred to the floating diffusion FD immediately after the photoelectric conversion.

In this embodiment, as described below, the pixel 200 can also be configured to include a second transient gate AB that can transfer unwanted charges from the photodiode PD to a region other than the floating diffusion FD.

The first embodiment includes the reading part 60 that reads out pixel signals from the pixels 200 of the pixel part 20. The pixel 200 is capable of modulation to an appropriate potential gradient by biasing the first transient gate PG under the control of the reading part 60.

In the first embodiment, the first transient gate PG may have a first lateral electric field modulation (LEFM) structure, in which a pair of first modulation gates TG1, TG2 are provided along the charge transfer path CTP between the floating diffusion FD and the photodiode PD (photoelectric conversion element), and a lateral electric field is applied to the first modulation gates TG1, TG2 with a transfer path TP pinned by a first conductive (p-type) semiconductor layer to control the potential of the photodiode PD (photoelectric conversion element).

The following outlines the configurations and functions of the parts of the solid-state imaging device 10, in particular, the configuration, functions, and effects of the pixel part 20 and the digital pixel having the LEFM structure.

<Configurations of Pixel Part 20 and Digital Pixel 200>

Figure 2:
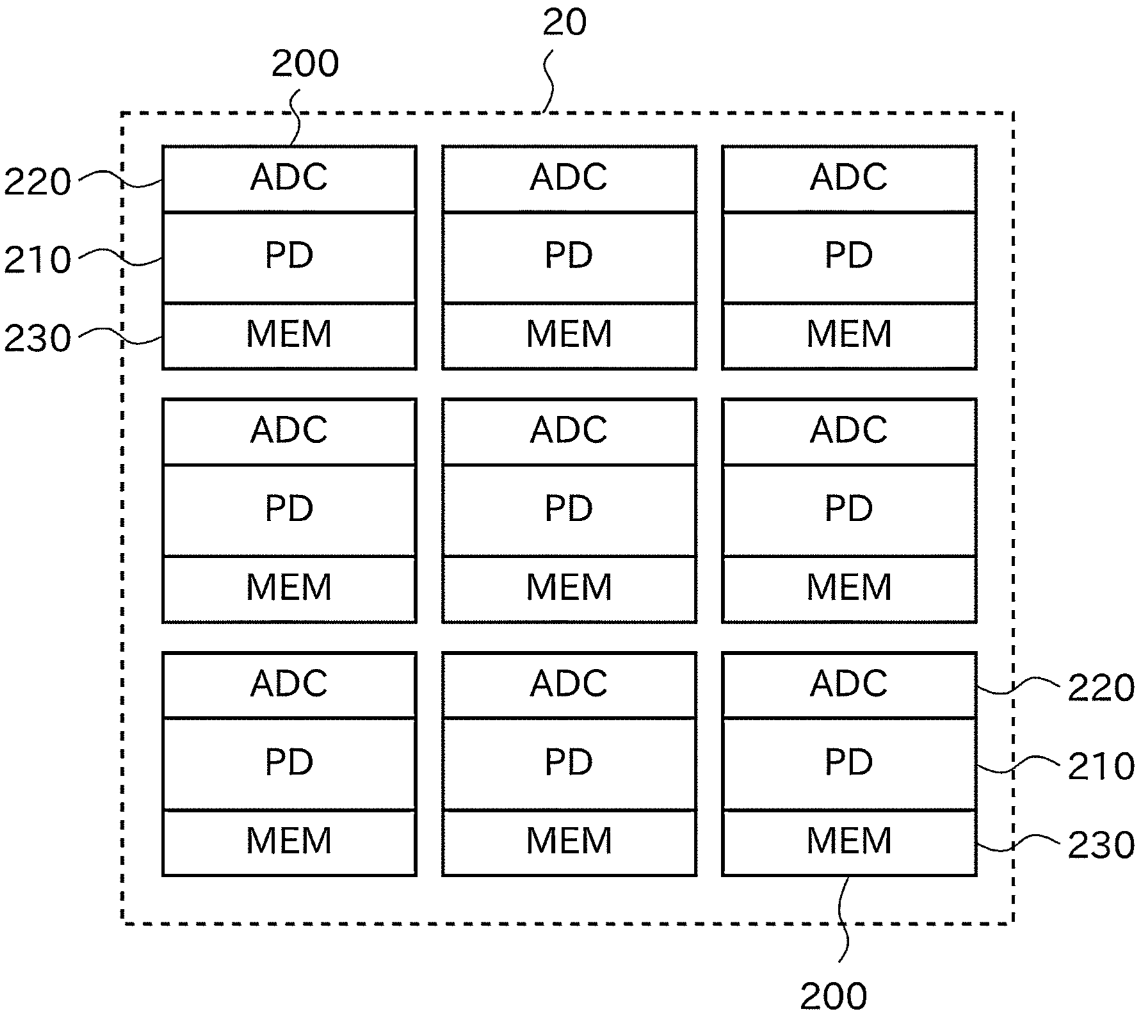
FIG. 2 shows an example of a digital pixel array of a pixel part of the solid-state imaging device relating to the first embodiment of the present invention.
Figure 3:
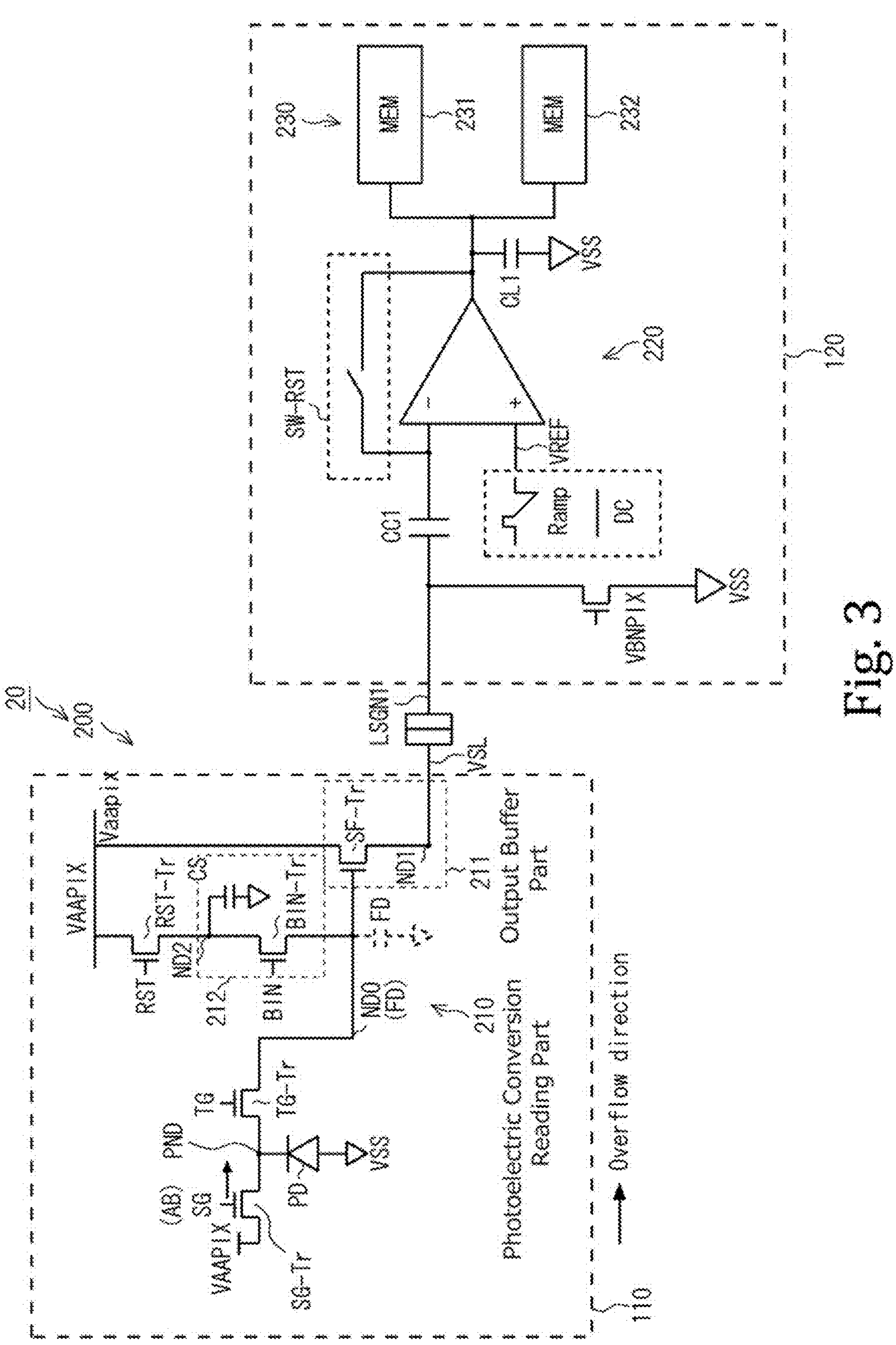
FIG. 3 is a circuit diagram showing an example of a digital pixel of the solid-state imaging device relating to the first embodiment of the present invention.
Figure 4:
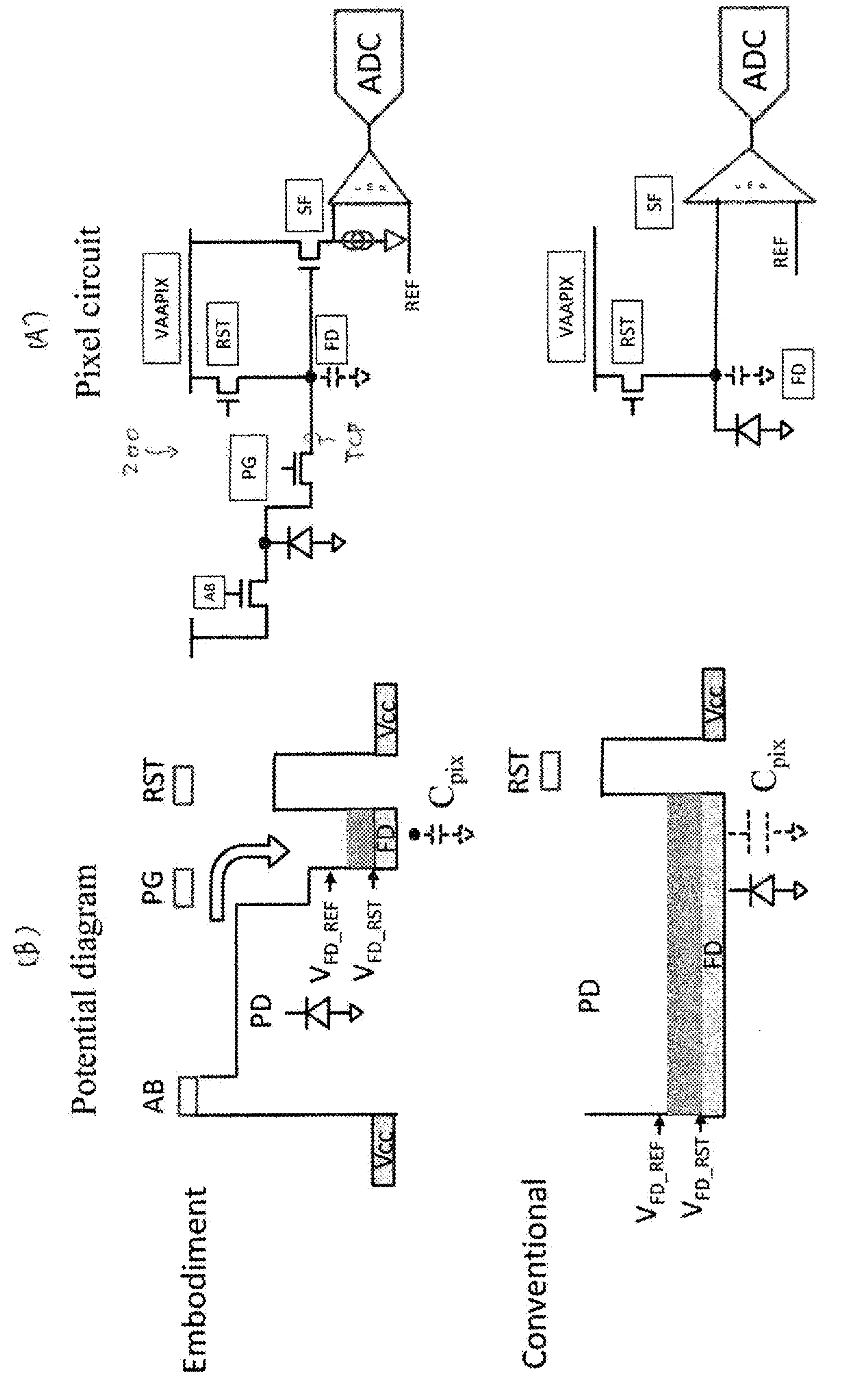
FIG. 4 is a circuit diagram showing extracted main parts of a photoelectric conversion reading part of a pixel of the solid-state imaging device relating to the first embodiment of the present invention.
Figure 5:
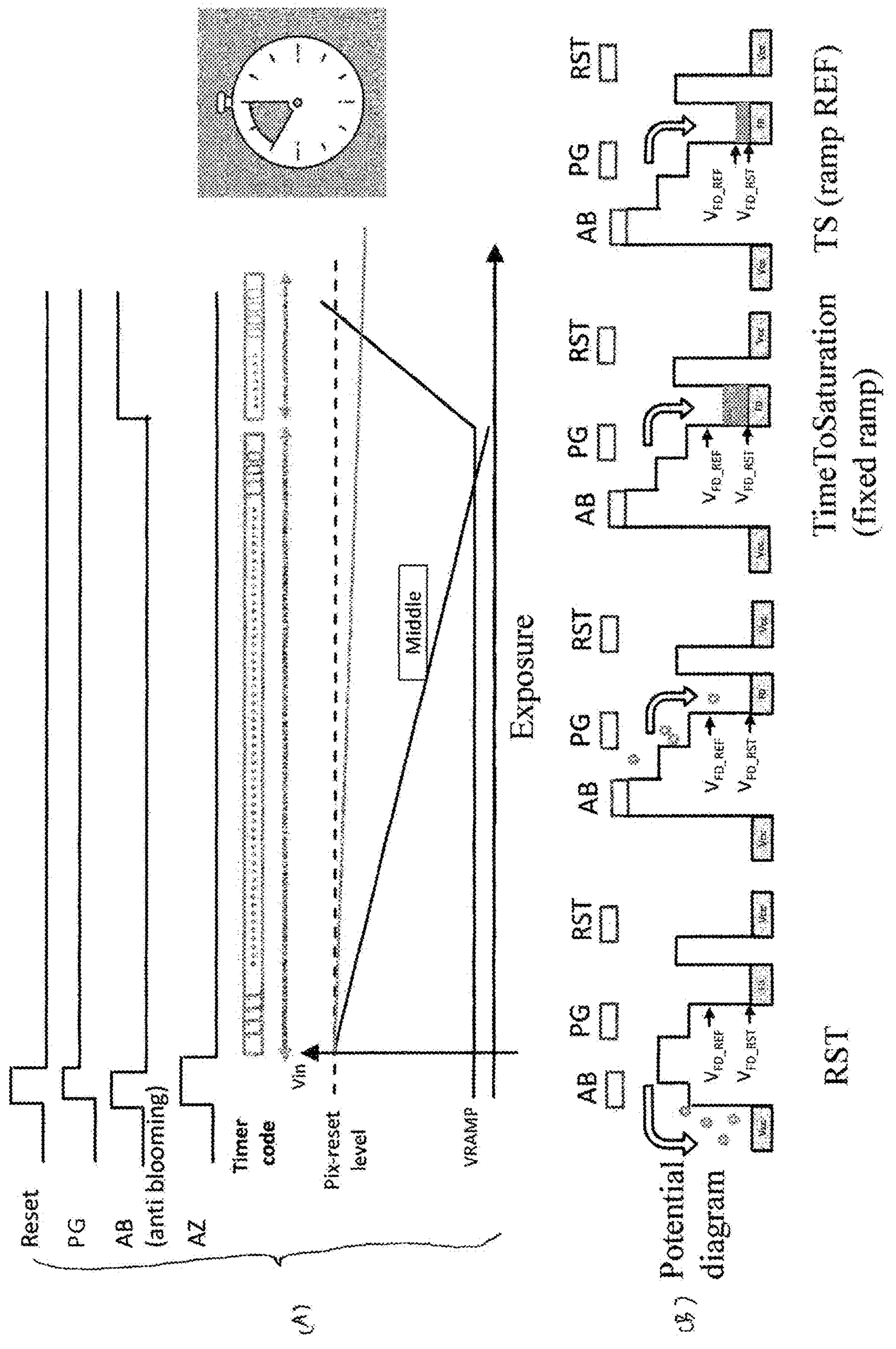
FIG. 5 shows a timing chart and a potential diagram of the DPS operation relating to the first embodiment of the invention.

FIG. 2 shows an example of the array of the digital pixels of the pixel part of the solid-state imaging device 10 relating to the first embodiment of the present invention. FIG. 3 is a circuit diagram showing an example of the pixel of the solid-state imaging device 10 relating to the first embodiment of the present invention. Parts (A) and (B) of FIG. 4 are a circuit diagram and a potential diagram, each showing, along with a comparative example, extracted main parts of a photoelectric conversion reading part 210 of a pixel of the solid-state imaging device relating to the first embodiment of the present invention. Parts (A) and (B) of FIG. 5 are a timing chart and a potential diagram showing the DPS operation concept of the solid-state imaging device 10 relating to the first embodiment of the invention.

In the pixel part 20, as shown in FIG. 2, a plurality of digital pixels 200 are arranged in a matrix of N rows and M columns. FIG. 2 shows an example where nine digital pixels 200 are arranged in a matrix of three rows and three columns (M=3, N=3) for the sake of simplicity.

The digital pixel 200 relating to the first embodiment includes a photoelectric conversion reading part (identified as "PD" in FIG. 2) 210, an AD converting part (identified as "ADC" in FIG. 2) 220, and a memory part (identified as "MEM" in FIG. 2) 230. The pixel part 20 relating to the first embodiment is configured as a stacked CMOS image sensor made up by a first substrate 110 and a second substrate 120. In the present example, as shown in FIG. 3, the photoelectric conversion reading part 210 is formed in the first substrate 110, and the AD converting part 220 and the memory part 230 are formed in the second substrate 120.

The photoelectric conversion reading part 210 of the digital pixel 200 includes a photodiode (a photoelectric conversion element) and an in-pixel amplifier. More specifically, the photoelectric conversion reading part 210 includes, for example, a photodiode PD, which is a photoelectric conversion element.

The photodiode PD has the function of immediately transferring the charges generated by photoelectric conversion to the floating diffusion FD during the integration period, and the generated and transferred charges are stored in the floating diffusion FD. In place of the transfer transistor applied in conventional CMOS image sensors, a first transient gate PG is placed between the storage part PND of the photodiode PD and the floating diffusion FD. A first shutter gate transistor SG-Tr, which serves as a first charge overflow gate element, is connected between the storage part PND of the photodiode PD and the predetermined fixed potential VAAPIX.

The photoelectric conversion reading part 210 includes, for the floating diffusion FD serving as the single output node ND, one reset transistor RST-Tr serving as a reset element, one source follower transistor SF-Tr serving as a source follower element, one storage transistor BIN-Tr serving as a storing element, one storage capacitor CS serving as a storing capacitance element, and one reading node ND1.

In the first embodiment, the source follower transistor SF-Tr and the reading node ND1 together constitute an output buffer part 211. The storage transistor BIN-Tr and the storage capacitor CS together constitute a gain switching part 212. In FIG. 4, the gain switching part 212 is omitted for simplicity of the drawing.

In the photoelectric conversion reading part 210 relating to the first embodiment, the reading node ND1 of the output buffer part 211 is connected to the input part of the AD converting part 220. The photoelectric conversion reading part 210 converts the charges in the floating diffusion FD serving as an output node into a voltage signal at a level corresponding to the amount of the charges and outputs the voltage signal VSL to the AD converting part 220.

For example, the photoelectric conversion reading part 210 outputs, in a first comparing operation period PCMP1 of the AD converting part 220, a voltage signal VSL corresponding to the overflow charges overflowing from the photodiode PD, which is a photoelectric conversion element, to the floating diffusion FD serving as an output node in an integration period PI.

Furthermore, the photoelectric conversion reading part 210 outputs, in a second comparing operation period PCMP2 of the AD converting part 220, a voltage signal VSL corresponding to the charges stored in the photodiode PD that are transferred to the floating diffusion FD serving as an output node in a transfer period PT following the integration period PI. The photoelectric conversion reading part 210 outputs a read-out reset signal (signal voltage) (VRST) and a read-out signal (signal voltage) (VSIG), as a pixel signal, to the AD converting part 220 in the second comparing operation period PCMP2.

The photodiode PD generates signal charges (electrons) in an amount in accordance with the quantity of the incident light and stores the generated signal charges. Description will be hereinafter given of a case where the signal charges are electrons and each transistor is an n-type transistor. However, it is also possible that the signal charges are holes or each transistor is a p-type transistor.

The photodiode (PD) in each digital pixel 200 is a pinned photodiode (PPD). The substrate surface for forming the photodiode (PD) has a surface level due to dangling bonds or other defects. Therefore, a lot of charges (dark current) are generated due to heat energy, as a result of which the signals fail to be read out correctly. The pinned photodiode (PPD) has the charge storage part embedded in the substrate, thereby reducing mixing of the dark current into signals.

Furthermore, the photoelectric conversion reading part 210 of the digital pixel 200 includes a first transient gate PG that is formed between the floating diffusion FD and the photodiode PD (photoelectric conversion element) and can control the charge transfer path CTP between the floating diffusion FD and the photodiode PD (photoelectric conversion element). In the first embodiment, the floating diffusion FD and the photodiode PD (photoelectric conversion element) are coupled by the first transient gate PG, and the photocharges generated by the photodiode PD (photoelectric conversion element) are transferred to the floating diffusion FD immediately after the photoelectric conversion.

In this embodiment, as described below, the pixel 200 can also be configured to include a second transient gate AB that can transfer unwanted charges from the photodiode PD to a region other than the floating diffusion FD.

In the first embodiment, the first transient gate PG may have a first lateral electric field modulation (LEFM) structure, in which a pair of first modulation gates TG1, TG2 are provided along the charge transfer path CTP between the floating diffusion FD and the photodiode PD (photoelectric conversion element), and a lateral electric field is applied to the first modulation gates TG1, TG2 with a transfer path TP pinned by a first conductive (p-type) semiconductor layer to control the potential of the photodiode PD (photoelectric conversion element).

The transfer transistor TG-Tr is typically connected between the storage part PND of the photodiode PD and the floating diffusion FD and controlled by a control signal TG applied to the gate thereof through a control line. The transfer transistor TG-Tr remains selected and in the conduction state during a transfer period PT in which the control signal TG is at the high (H) level, to transfer to the floating diffusion FD the charges (electrons) produced by the photoelectric conversion and then stored in the photodiode PD. After the photodiode PD and the floating diffusion FD are reset to a predetermined reset potential, the photodiode PD enters the integration period PI. At this time, the charges generated by the incident light overflow into the floating diffusion FD through the path under the transfer transistor TG0-Tr controlled such that the FD's own capacitance (i.e., gain) is not affected, and the corresponding signal voltage is generated.

The shutter gate transistor SG-Tr serving as the charge overflow gate element is connected between the storage part PND of the photodiode PD and the predetermined fixed potential VAAPIX and controlled by a control signal SG applied thereto through a control line. The shutter gate transistor SG-Tr remains selected and in the conduction state during the period in which the control signal SG is at the H level, for example, to form an emitter flow providing for antiblooming function between the charge storing part PND of the photodiode PD and the predetermined fixed potential VAAPIX. In this way, unnecessary charges are released to the fixed potential VAAPIX.

As described above, the transfer transistor TG-Tr and the shutter gate transistor SG-Tr are driven and controlled at individually selected timings.

The reset transistor RST-Tr is connected between the power supply line Vdd of the power supply voltage VDD and the floating diffusion FD and controlled by a control signal RST applied to the gate thereof through a control line. The reset transistor RST-Tr remains selected and in the conduction state during a reset period in which the control signal RST is at the H level, to reset the floating diffusion FD to the potential of the power supply line Vdd of the power supply voltage VDD.

The storage transistor BIN-Tr is connected between the floating diffusion FD and the reset transistor RST-Tr, and the storage capacitor CS is connected between a connection node ND2 and the reference potential VSS. The storage transistor BIN-Tr is controlled by a control signal BIN applied to the gate thereof through a control line. The storage transistor BIN-Tr remains selected and in the conduction state during a reset period in which the control signal BIN is at the H level so as to connect the floating diffusion FD and the storage capacitor CS.

The source follower transistor SF-Tr serving as a source follower element is connected at the source thereof to the reading node ND1, at the drain thereof to the power supply line Vdd, and at the gate thereof to the floating diffusion FD. The output node ND1 forming the output buffer part 211 is connected to a signal line LSGN1, which is connected to the input part of the AD converting part 220. The drain and source of the current transistor IC-Tr serving as a current source element are connected between the signal line LSGN1 to which the reading node ND1 is connected and the reference potential VSS (for example, GND). The gate of the current transistor IC-Tr is connected to the feeding line of a control signal VBNPIX. The signal line LSGN1 between the reading node ND1 and the input part of the AD converting part 220 is driven by the current transistor IC-Tr serving as a current source element.

Figure 6:
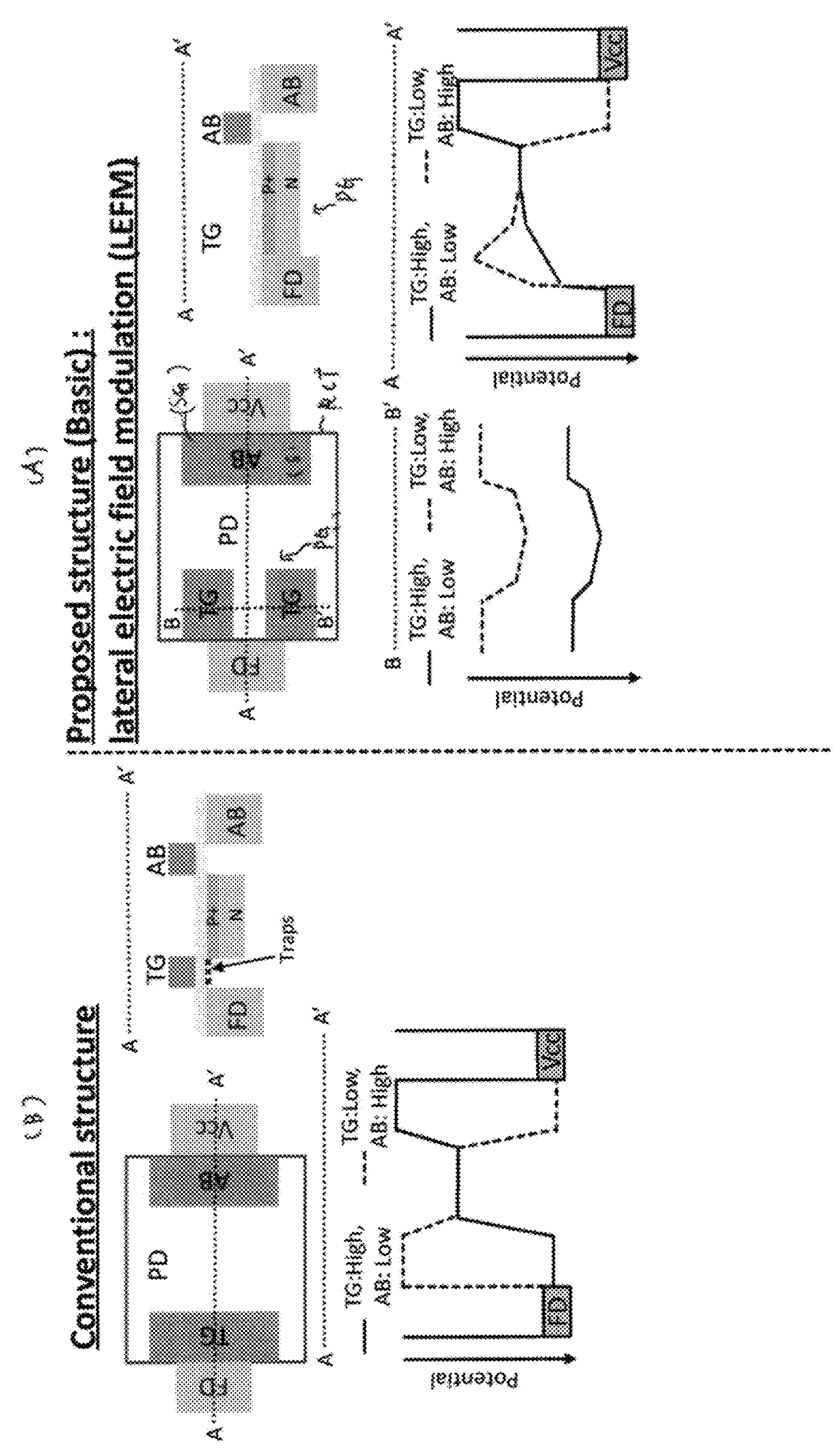
FIG. 6 shows a simplified plan view, simplified cross-sectional view, and potential diagram showing an example configuration of a charge transfer system having a first transient gate, which is the main part of the digital pixel relating to the first embodiment of the invention, and FIG. 6 also shows a simplified plan view, simplified cross-sectional view, and potential diagram showing an example configuration of a charge storage transfer system of a comparative example not having the first transient gate.
Figure 7:
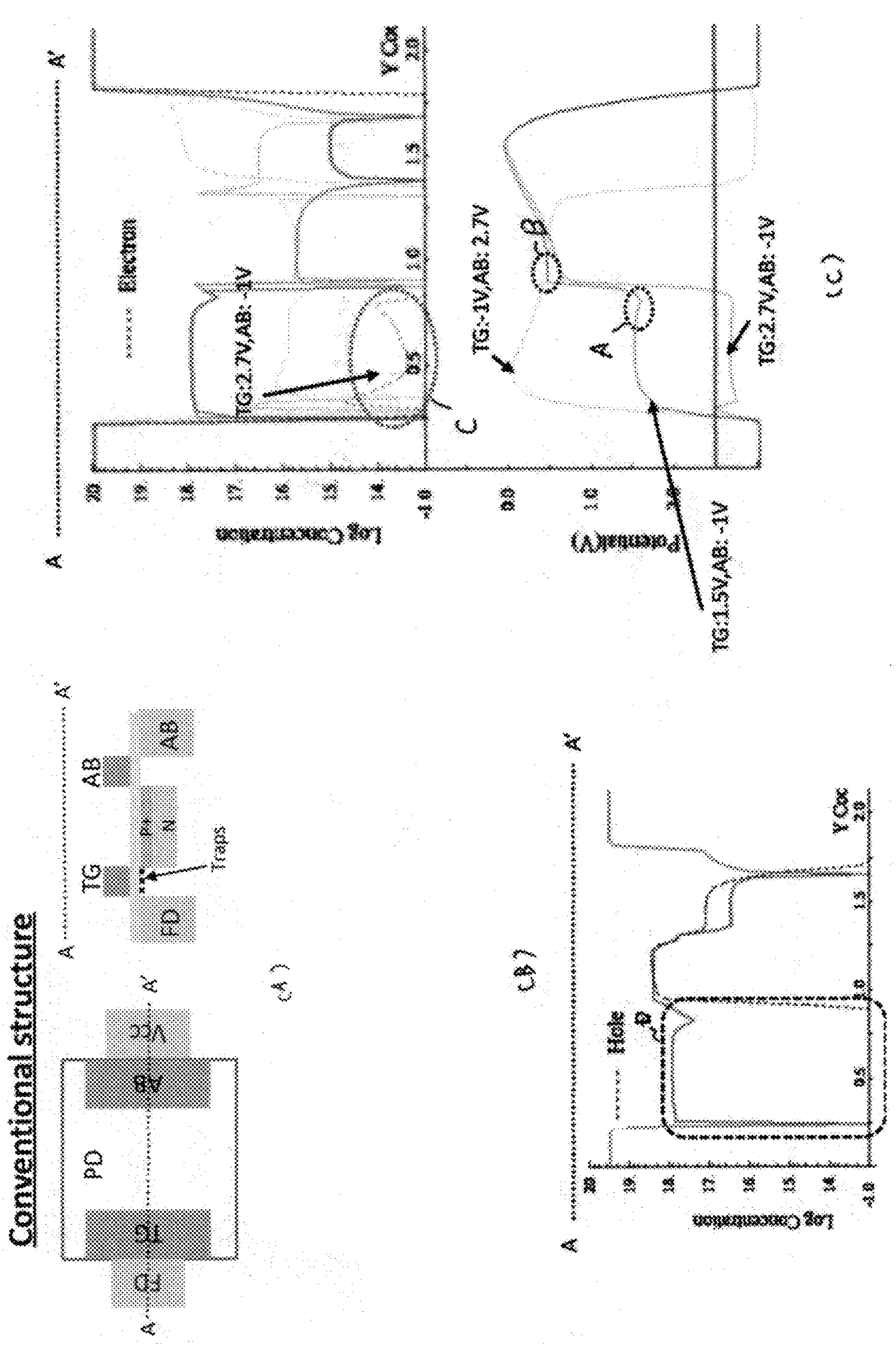
FIG. 7 illustrates the operation, efficiency and the like of the charge storage transfer system of the comparative example.
Figure 8:
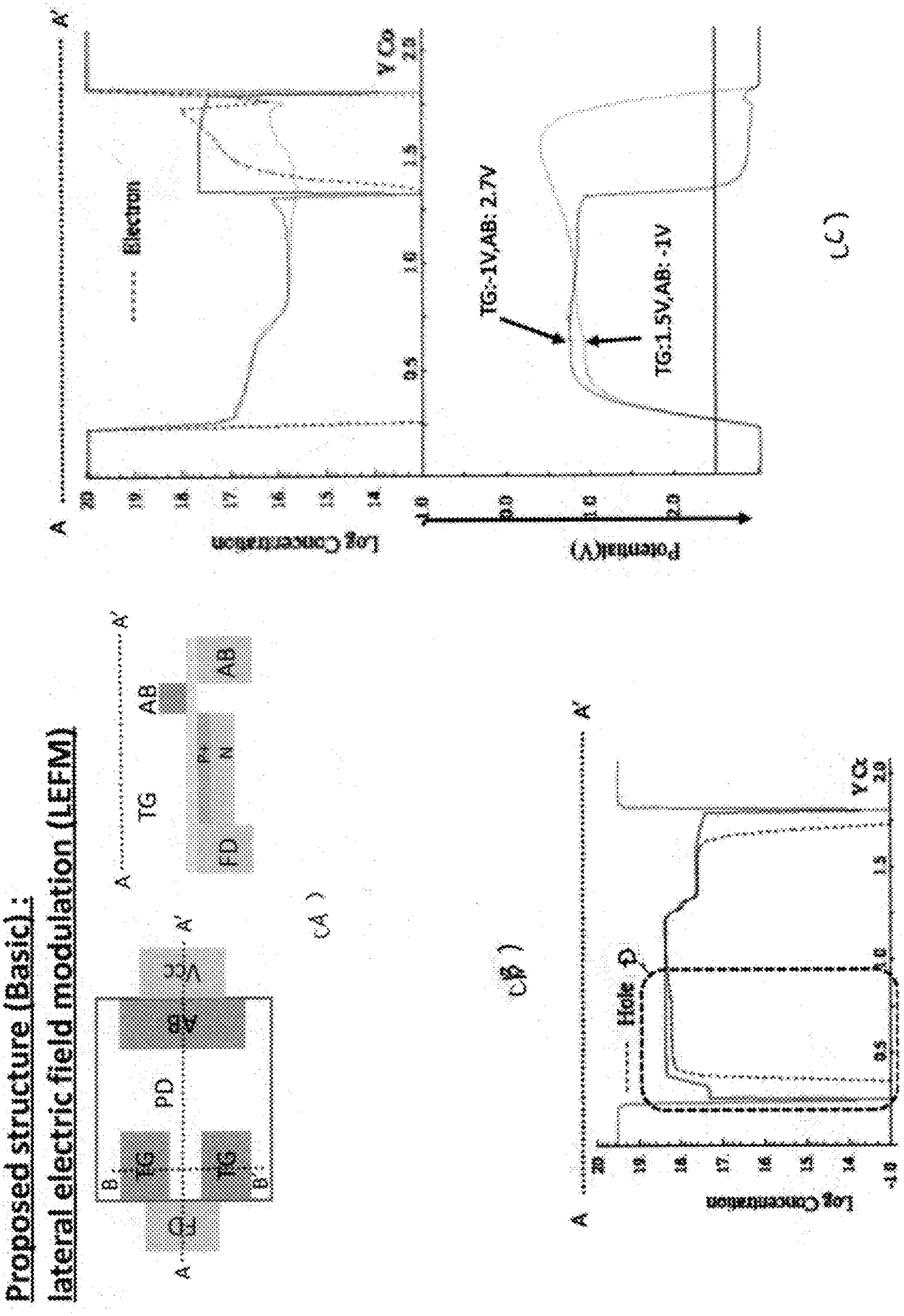
FIG. 8 illustrates the operation, efficiency and the like of the charge transfer system having the first transient gate, which is the main part of the digital pixel relating to the first embodiment of the invention.

Part (A) of FIG. 6 shows a simplified plan view, a simplified cross-sectional view, and a potential diagram showing an example configuration of a charge transfer system having the first transient gate PG that constitutes the main part of a digital pixel relating to the first embodiment of the present invention. Part (B) of FIG. 6 shows a simplified plan view, a simplified cross-sectional view, and a potential diagram showing an example configuration of a charge storage transfer system of a comparative example not having the first transient gate PG. FIG. 7 illustrates the operation, efficiency and the like of the charge storage transfer system of the comparative example. FIG. 8 illustrates the operation, efficiency and the like of the charge transfer system having the first transient gate, which is the main part of the digital pixel relating to the first embodiment of the invention.

In this example, the photodiode PD is formed as a rectangular region RCT, with the floating diffusion FD connected to one side thereof in the X direction, and the shutter gate AB overlapping the other side. The first transient gate PG has a first lateral electric field modulation (LEFM) structure, in which a pair of first modulation gates TG1, TG2 are provided along the charge transfer path CTP between the floating diffusion FD and the photodiode PD (photoelectric conversion element), and a lateral electric field is applied to the first modulation gates TG1, TG2 with a transfer path TP pinned by a first conductive (p-type) semiconductor layer to control the potential of the photodiode PD (photoelectric conversion element).

In the CMOS image sensor relating to this embodiment, a set of first modulation gates TG1, TG2 having the LEFM-TG structure is placed next to the charge path with one PG (LEFM), one PD, and one AB gate. This structure is the same as in the comparative example (conventional type) except for the LEFM. In the LEFM-TG, the potential of the photodiode PD is controlled by applying a lateral electric field. The LEFM-TG has the advantage that all transfer paths TP are pinned by P+ layer 2001, and thus there are no barriers and no traps on the transfer paths. Thus, low dark current can be achieved. In the comparative example, the TG is on during the exposure time, and thus there are many traps under the TG gate. Therefore, the traps cause a large dark current.

A description will now be given of the operation, efficiency and the like of the charge transfer system having the first transient gate, which is the main part of the digital pixel relating to the comparative example and the first embodiment of the invention.

The comparative example is shown in association with FIG. 7. In the structure of the comparative example, when a low voltage such as 1.5 V is applied to the gate TG, there are a PD-TG barrier (dashed circle denoted by A) and a barrier under the gate TG (dashed circle denoted by B), and the electrons generated from the photodiode PD are disturbed in their transfer to the floating diffusion FD. Therefore, it is necessary to apply a high voltage such as 2.7 V. However, when a high voltage is applied, electrons from the floating diffusion FD may flow back under the gate TG (dashed circle denoted by C), which is called a pumping phenomenon. While the gate TG is on, there is no hole under the gate TG (dashed circle denoted by D), and a large amount of dark current is generated from the traps under the gate TG.

This embodiment is shown in association with FIG. 8. In the LEFM structure, even if a low voltage such as 1.5 V is applied to the gate TG, an electric field gradient is generated in the entire region of the charge transfer path from the photodiode PD to the floating diffusion FD, allowing field transfer without barriers. Therefore, there is no need to increase the potential of the charge transfer path CTP, and no charge backflow occurs from the FD. Even if the gate TG of the LEFM structure is On, the transfer path to the FD is covered with a high concentration of holes as in the PD (dashed circle denoted by D), which prevents dark current from the traps. Compared to the structure of the comparative example (conventional art), the LEFM structure of the first embodiment is capable of driving at a lower voltage, resulting in lower power consumption, better charge transfer efficiency, and lower noise by eliminating the charge traps.

The following description refers again to FIGS. 1 to 2.

The AD converting part 220 of the digital pixel 200 compares the analog voltage signal VSL output from the photoelectric conversion reading part 210 against the referential voltage VREF, which has a ramp waveform varying with a predetermined gradient or a fixed voltage level, to convert the analog signal into a digital signal.

As shown in FIG. 3, the AD converting part 220 includes a comparator (COMP) 221, an output-side load capacitor CL1 and a reset switch SW-RST.

In the comparator 221, a first input terminal or inversion input terminal (−) receives the voltage signal VSL fed thereto, which is output from the output buffer part 211 of the photoelectric conversion reading part 210 to the signal line LSGN1, and a second input terminal or non-inversion input terminal (+) receives the referential voltage VREF fed thereto. The comparator 221 performs AD conversion (a comparing operation) of comparing the voltage signal VSL against the referential voltage VREF and outputting a digital comparison result signal SCMP.

The first input terminal or inversion input terminal (−) of the comparator 221 is connected to a coupling capacitor CC1. In this way, the output buffer part 211 of the photoelectric conversion reading part 210 formed on the first substrate 110 is AC coupled to the input part of the comparator 221 of the AD converting part 220 formed on the second substrate 120, so that the noise can be reduced and high SNR can be achieved when the illuminance is low.

As for the comparator 221, the reset switch SW-RST is connected between the output terminal and the first input terminal or inversion input terminal (−), and the load capacitor CL1 is connected between the output terminal and the reference potential VSS.

In the AD converting part 220, basically, the comparator 221 compares the analog signal (the potential VSL) read from the output buffer part 211 of the photoelectric conversion reading part 210 to the signal line LSGN1 against the referential voltage VREF, for example, a ramp signal RAMP that linearly changes with a certain gradient or has a slope waveform. During the comparison, a counter (not shown), which is provided for each column as is the comparator 221, is operating. The ramp signal RAMP having a ramp waveform and the value of the counter vary in a one-to-one correspondence, so that the voltage signal VSL is converted into a digital signal. Basically, the AD converting part 220 converts a change in voltage, in other words, a change in the referential voltage VREF (for example, the ramp signal RAMP) into a change in time, and counts the change in time at certain intervals (with certain clocks). In this way, a digital value is obtained. When the analog signal VSL and the ramp signal RAMP (the referential voltage VREF) cross each other, the output from the comparator 221 is inverted, the clock input into the counter (not shown) is stopped or the suspended clock is input into the counter (not shown), and the value (data) of the counter at that timing is saved in the memory part 230. In this way, the AD conversion is completed. After the end of the above-described AD converting period, the data (signal) stored in the memory part 230 of each digital pixel 200 is output through the output circuit 40 to a signal processing circuit (not shown) and subjected to predetermined signal processing, so that a two-dimensional image is produced.

The memory part 230 is formed by an SRAM or DRAM, receives digital signals fed thereto, is compatible with photo conversion codes, and can be read by an external 10 buffer in the output circuit 40 near the pixel array. In the present example, the memory part 230 includes two memories 231 and 232 connected to the output from the comparator 221.

The vertical scanning circuit 30 drives the photoelectric conversion reading part 210 of each digital pixel 200 through row-scanning control lines in shutter and reading rows, under the control of the timing control circuit 50. The vertical scanning circuit 30 feeds a referential voltage VREF, which is set in accordance with the comparing operation, to the comparator 221 of each digital pixel 200, under the control of the timing control circuit 50. Further, the vertical scanning circuit 30 outputs, according to an address signal, row selection signals indicating the row addresses of the reading row from which signals are to be read out and the shutter row in which the charges stored in the photodiodes PD are to be reset.

The output circuit 40 includes an IO buffer arranged in correspondence with the output from the memory in each of the digital pixels 200 in the pixel part 20 and outputs the digital data read from each digital pixel 200 to outside.

The timing control circuit 50 generates timing signals required for signal processing in the pixel part 20, the vertical scanning circuit 30, the output circuit 40, and the like.

As described above, in the first embodiment, the pixel 200 includes the photodiode PD, the first transient gate (PG), the shutter gate (AB), the reset (RST) transistor, and the source follower (SF) transistor. The photodiode PD is formed of a pinned photodiode, and the modulation gate (transfer gate) of the first transient gate (PG) is connected to the charge transfer path CTP to the floating diffusion FD during the integration period. The RST gate is connected to forcibly set the FD to a resting level (Vrst) before the charges are transferred. The electrons generated by photoelectric conversion are transferred immediately after they are generated in the photodiode PD and stored in the FD separately formed. The charge of an optical signal is converted to the voltage domain (Vsig) at the node capacitance of the FD according to the applied optical signal level (Qsig: optical signal charge) using the following formula: Vsig−Vrst=Qsig/C(FD). This conversion factor follows the FD node capacitance. The optical signal (Vsig-Vrst) of FD is applied to an amplifier circuit, e.g., the SF gate with a constant load current as the source follower buffer, and is coupled as ADC input through a comparator that needs to input a reference signal as an operating reference during the exposure period. The comparator can be constituted by a reset switch and an output load capacitance. The memory such as SRAM or DRAM is connected to the comparator output as a digital signal corresponding to the photoelectric conversion code, and can be read by the external IO buffer near the pixel array at any period of time.

The first embodiment provides characteristics of high gain and low noise as much as possible in a configuration of the DPS that can detect stored signals during the integration period.

The solid-state imaging device 10 relating to the first embodiment can widen the dynamic range by performing a reading operation in a predetermined mode while the pixel achieves a small size. Additionally, the first embodiment is capable of substantially achieving a widened dynamic range and a raised frame rate, achieving reduced noise, and maximizing the effective pixel region and value per cost.

Second Embodiment

Figure 9:
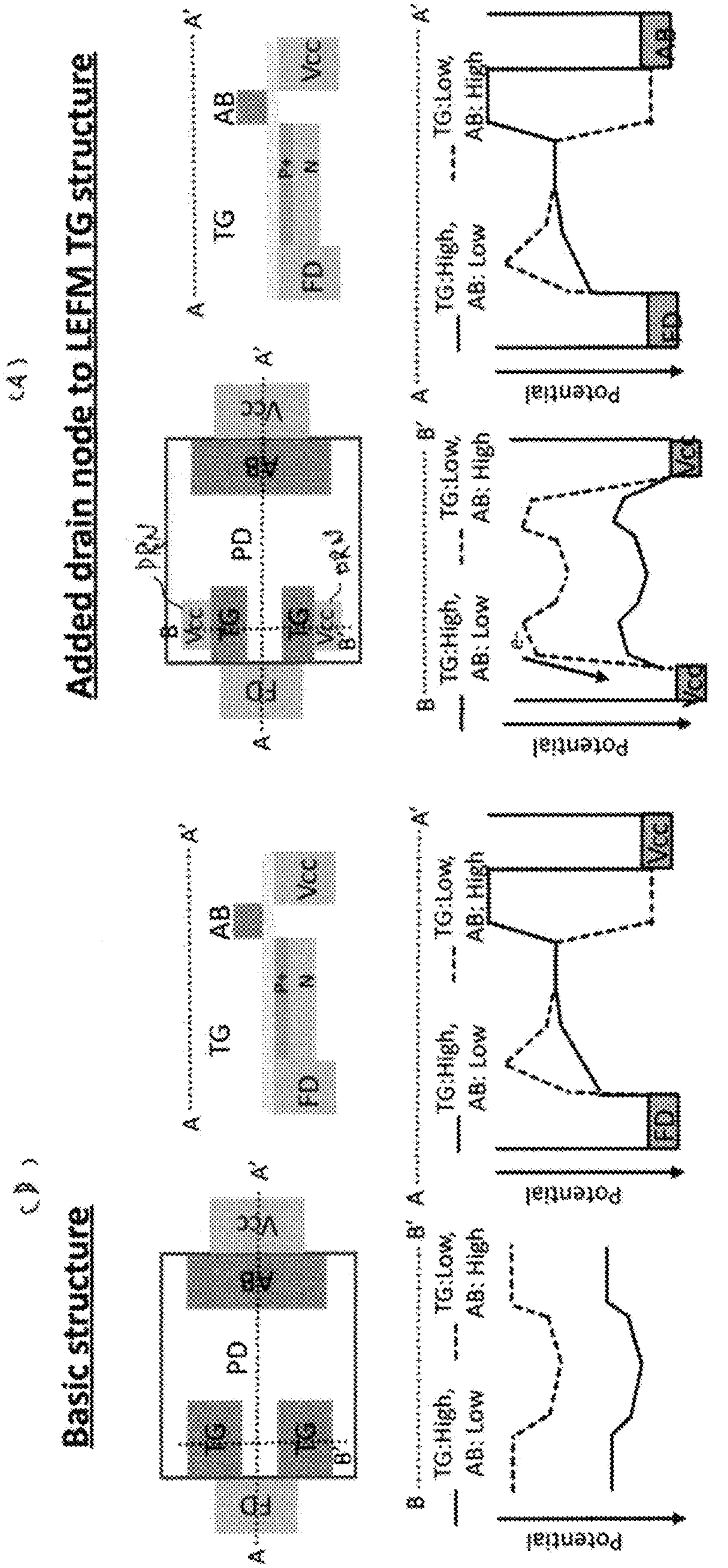
FIG. 9 shows a simplified plan view, simplified cross-sectional view, and potential diagram showing an example configuration of a charge transfer system having a first transient gate, which is the main part of the digital pixel relating to a second embodiment of the invention, and FIG.

Part (A) of FIG. 9 shows a simplified plan view, a simplified cross-sectional view, and a potential diagram showing an example configuration of a charge transfer system having the first transient gate PG that constitutes the main part of a digital pixel relating to the second embodiment of the present invention. Part (B) of FIG. 9 shows a simplified plan view, a simplified cross-sectional view, and a potential diagram showing an example configuration of a charge storage transfer system of a basic structure having the first transient gate PG.

A pixel 200A of the solid-state imaging device 10A relating to the second embodiment differs from the pixel 200 of the solid-state imaging device 10 relating to the above-described first embodiment in the following points.

In the pixel 200A of the solid-state imaging device 10A relating to the second embodiment, a drain node DRN is added and coupled to the LEFM-TG to prevent the charges generated at the modulation gate (transfer gate) TG from being transferred to the FD node.

In this way, the LEFM structure can have the drain node DRN added onto the gate TG. The charges generated at the gate TG are drained by the drain node DRN to prevent leakage to the FD node. The drain node DRN has a higher potential than the gate TG and forms a barrier between TG and PD, and thus the charges generated under TG drift to the drain.

The second embodiment can not only produce the same effects as the above-described first embodiment but also provide characteristics of high gain and low noise as much as possible.

Third Embodiment

Part (A) of FIG. 10 shows a simplified plan view, a simplified cross-sectional view, and a potential diagram showing an example configuration of a charge transfer system having the first and second transient gates PG that constitute the main part of a digital pixel relating to the third embodiment of the present invention. Part (B) of FIG. 10 shows a simplified plan view, a simplified cross-sectional view, and a potential diagram showing an example configuration of a charge storage transfer system of a basic structure having the first transient gate PG.

A pixel 200B of the solid-state imaging device 10B relating to the third embodiment differs from the pixel 200A of the solid-state imaging device 10A relating to the above-described second embodiment in the following points.

The pixel 200B of the solid-state imaging device 10B relating to the third embodiment employs the LEFM structure for the second transient gate PG2 in addition to the first transient gate PG1. This configuration serves to unify (uniform) the bias between TG and AB.

Thus, an additional advantage of the AB gate with the LEFM structure is that it prevents spillback of charges from the gate AB when the gate AB is turned off (exposure starts). In the conventional comparative example, charges are present under the gate AB while the gate AB is high to drain unwanted charges to the drain node. These charges may affect the photodiode PD when the gate AB is turned off and exposure is started. In the LEFM structure, the transfer path TP has a large potential gap to the drain node DRN and there is no risk of spillback.

Part (A) of FIG. 11 shows a simplified plan view, a simplified cross-sectional view, and a potential diagram illustrating a simulation result of a charge transfer system having the first and second transient gates PG2 that constitute the main parts of the digital pixel relating to the third embodiment of the present invention. Part (B) of FIG. 11 shows a simplified plan view, a simplified cross-sectional view, and a potential diagram illustrating a simulation result of a charge storage transfer system of a comparative example not having the first and second transient gates PG2.

In the comparison example, the gate AB has a potential of 2.2V, which is greater than n-fermi, and charges are present under the gate AB. These charges could spill over when the gate AB is turned off due to potential barriers. In contrast, since the transfer path TP has a large potential gap to the drain node DRN, the risk of photocharges spilling over is extremely small.

FIG. 12 shows examples of an equivalent circuit of the main part of a pixel with two modulation gates TG arranged along the charge transfer path CTP.

The solid-state imaging devices 10, 10A, 10B described above can be applied, as an imaging device, to electronic apparatuses such as digital cameras, video cameras, mobile terminals, surveillance cameras, and medical endoscope cameras.

FIG. 13 shows an example of the configuration of an electronic apparatus including a camera system to which the solid-state imaging devices relating to the embodiments of the present disclosure are applied.

As shown in FIG. 13, the electronic apparatus 300 includes a CMOS image sensor 310 that can be constituted by the solid-state imaging devices 10, 10A or 10B relating to the embodiments of the present invention. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing the output signals from the CMOS image sensor 310.

The signal processing circuit 330 performs predetermined signal processing on the output signals from the CMOS image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the solid-state imaging device 10, 10A, 10B as the CMOS image sensor 310. Accordingly, the embodiments of the present disclosure can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, wherein the FD and the photoelectric conversion element are coupled by the first transient gate, and the photocharges generated by the photoelectric conversion element are transferred immediately to the FD during an integration period.

2. The solid-state imaging device of claim 1, wherein each pixel includes:

a reset element for resetting the FD to a predetermined potential; and an output buffer part for converting the charges of the FD into a voltage signal at a level determined by an amount of the charges and outputting the voltage signal, and wherein the pixel or a pixel array includes a comparator configured to perform a comparing operation of comparing the voltage signal output from the output buffer part against a referential voltage and outputting a digital comparison result signal.

3. The solid-state imaging device of claim 1, wherein the first transient gate couples the floating diffusion and the photoelectric conversion element during an integration period such that photocharges generated by photoelectric conversion are immediately transferred to the floating diffusion without being accumulated in an intermediate charge storage region.

4. A solid-state imaging device comprising:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, and wherein the FD and the photoelectric conversion element are coupled by the first transient gate, and the photocharges generated by the photoelectric conversion element are transferred immediately to the FD, and wherein each pixel includes a second transient gate configured to transfer unwanted charges from the photoelectric conversion element to a region other than the FD.

5. The solid-state imaging device of claim 4, wherein each pixel has:

a gain switching part including:

a storage connecting element connected to the FD; and a storage capacitance element for storing therein the charges of the FD via the storage connecting element, and wherein the gain switching part is configured to switch conversion gain in reading operation.

6. A solid-state imaging device comprising:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, and wherein the FD and the photoelectric conversion element are coupled by the first transient gate, and the photocharges generated by the photoelectric conversion element are transferred immediately to the FD, further comprising a reading part for reading a pixel signal from each of the pixels in the pixel part, wherein each pixel is configured to modulate to an appropriate potential gradient by biasing the first transient gate under control of the reading part.

7. The solid-state imaging device of claim 6, wherein the first transient gate has a first lateral electric field modulation (LEFM) structure, and wherein a pair of first modulation gates are provided along the charge transfer path between the FD and the photoelectric conversion element, and a lateral electric field is applied to the first modulation gates with a transfer path pinned by a first conductive semiconductor layer to control a potential of the photoelectric conversion element.

8. The solid-state imaging device of claim 7, wherein the first LEFM structure includes a first drain connected to the first modulation gates and configured to drain charges generated at the first modulation gates to inhibit leakage of the generated charges to the FD.

9. The solid-state imaging device of claim 8, wherein, in the first LEFM structure, the first drain has a higher potential than the first modulation gates, and a barrier is formed between the first modulation gates and the photoelectric conversion element.

10. The solid-state imaging device of claim 9, wherein a second transient gate has:

a second LEFM structure, wherein a pair of second modulation gates are provided along the charge transfer path between the FD and the photoelectric conversion element, and a lateral electric field is applied to the second modulation gates with a transfer path pinned by a first conductive semiconductor layer to control a potential of the photoelectric conversion element.

11. The solid-state imaging device of claim 10, wherein the second LEFM structure includes a second drain connected to the second modulation gates and configured to drain charges generated at the second modulation gates to inhibit leakage of the generated charges to the FD.

12. The solid-state imaging device of claim 11, wherein, in the second LEFM structure, the second drain has a higher potential than the second modulation gates, and a barrier is formed between the second modulation gates and the photoelectric conversion element.

13. A solid-state imaging device comprising:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, and wherein the FD and the photoelectric conversion element are coupled by the first transient gate, and the photocharges generated by the photoelectric conversion element are transferred immediately to the FD, wherein each pixel includes:

a reset element for resetting the FD to a predetermined potential; and an output buffer part for converting the charges of the FD into a voltage signal at a level determined by an amount of the charges and outputting the voltage signal, and wherein the pixel or a pixel array includes a comparator configured to perform a comparing operation of comparing the voltage signal output from the output buffer part against a referential voltage and outputting a digital comparison result signal, and wherein the referential voltage can be set as a ramp or constant to obtain a threshold for monitoring corresponding photocharges.

14. A method for driving a solid-state imaging device, the solid-state imaging device including:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, the method comprising:

coupling, by the first transient gate, the FD and the photoelectric conversion element; and transferring immediately the photocharges generated by the photoelectric conversion element to the FD during an integration period.

15. An electronic apparatus comprising:

a solid-state imaging device; and an optical system for forming a subject image on the solid-state imaging device, wherein the solid-state imaging device includes:

a pixel part having pixels arranged therein, each pixel being configured to perform photoelectric conversion, wherein each pixel includes:

a photoelectric conversion element for generating photocharges by photoelectric conversion;

a floating diffusion (FD) to which the photocharges generated by the photoelectric conversion element are transferred; and a first transient gate formed between the FD and the photoelectric conversion element and configured to control a charge transfer path between the FD and the photoelectric conversion element, and wherein the FD and the photoelectric conversion element are coupled by the first transient gate, and the photocharges generated by the photoelectric conversion element are transferred immediately to the FD during an integration period.

* * * * *